(12) United States Patent
Burcheci et al.

(10) Patent No.: US 12,245,102 B2
(45) Date of Patent: Mar. 4, 2025

(54) SYSTEM AND METHOD FOR APPOINTMENT SCHEDULING

(71) Applicants: Emanuel Burcheci, Woodinville, WA (US); Tameta Burcheci, Woodinville, WA (US)

(72) Inventors: Emanuel Burcheci, Woodinville, WA (US); Tameta Burcheci, Woodinville, WA (US)

(73) Assignee: Qbitt, Inc., Woodinville, WA (US)

( * ) Notice: Subject to any disclaimer, the term of this patent is extended or adjusted under 35 U.S.C. 154(b) by 0 days.

(21) Appl. No.: 17/864,431

(22) Filed: Jul. 14, 2022

(65) Prior Publication Data

US 2022/0353640 A1 Nov. 3, 2022

Related U.S. Application Data

(63) Continuation of application No. 16/295,795, filed on Mar. 7, 2019, now abandoned.

(51) Int. Cl.
*H04W 4/029* (2018.01)
*G06Q 10/1093* (2023.01)

(52) U.S. Cl.
CPC ........ *H04W 4/029* (2018.02); *G06Q 10/1095* (2013.01)

(58) Field of Classification Search
None
See application file for complete search history.

(56) References Cited

U.S. PATENT DOCUMENTS

| | | | |
|---|---|---|---|
| 9,741,021 B2 | 8/2017 | Yu et al. | |
| 2007/0271129 A1 | 11/2007 | Dutton et al. | |
| 2009/0070181 A1* | 3/2009 | Loeffen | G06Q 10/02 705/5 |
| 2010/0191569 A1 | 7/2010 | Ellis et al. | |
| 2013/0232062 A1* | 9/2013 | Leventhal | G06Q 10/1053 705/321 |
| 2014/0025524 A1 | 1/2014 | Sims et al. | |
| 2014/0108121 A1 | 4/2014 | Norton et al. | |
| 2014/0278671 A1* | 9/2014 | Leonhardt | G06Q 10/1095 705/7.19 |
| 2016/0034936 A1 | 2/2016 | Bryant, III et al. | |
| 2017/0213250 A1* | 7/2017 | Ortega | G06Q 30/0255 |
| 2017/0220966 A1* | 8/2017 | Wang | G06Q 20/322 |
| 2019/0122183 A1* | 4/2019 | Kalyani | H04L 9/0861 |
| 2021/0150609 A1* | 5/2021 | Ma | G06Q 30/0251 |

OTHER PUBLICATIONS

"Visibook," Visibook.com. https://visibook.com/ [Date accessed: Dec. 3, 2018].

* cited by examiner

*Primary Examiner* — Hafiz A Kassim
*Assistant Examiner* — Zahra Elkassabgi
(74) *Attorney, Agent, or Firm* — Bold IP PLLC; Christopher Mayle (57) ABSTRACT

A method and system for appointment scheduling, the computer implemented method acting a digital rolodex for clients to schedule appointments for any number of services from businesses whereby they may also be provided with live updates of the location of the businesses and their employees when providing services and may receive an invoice for the services as well as pay for the services. The business may have advertisements for the business appear more or less frequent depending on the volume of appointments scheduled in the calendar and may be provided with live updates of the location of the client.

6 Claims, 7 Drawing Sheets

SYSTEM AND METHOD FOR APPOINTMENT SCHEDULING

CROSS REFERENCE TO RELATED APPLICATIONS

This application is a continuation that claims priority to U.S. patent application Ser. No. 16/295,795 filed on Mar. 7, 2019.

FIELD OF DISCLOSURE

The overall field of this invention is online scheduling and booking for appointments. More particularly this invention relates to an online calendar system and computer implemented method for calendar scheduling for clients to book appointments with one or more businesses for the services the businesses provide.

BACKGROUND

Customarily every business requires a person such as a receptionist, clerk, or assistant to schedule appointments for clients, which then need to be verified manually by a supervisor, boss, or actual employee providing the service and then confirmed. Now the world is more connected than it has ever been where businesses interact with clients on a much broader scale where appointments are being scheduled, modified, confirmed, and even cancelled at an exponentially quicker pace. Many businesses rely solely or predominantly on appointments and reservations to keep their business active and running. When an appointment is double booked or the client doesn't show because of miscommunication, the loss of business may cause friction for all parties involved.

Some businesses currently work with an outside company such as an aggregator or meta-search engine to operate booking and appointments for the business. However, these companies charge a commission rate and many businesses do not have the capacity to access the other companies' extranet daily to monitor cancellations and modifications, which may lead to delays in responses as well. Also, because these companies allow clients to cancel appointments and then permit other clients to schedule in their place, businesses may miss the opportunity to respond to a cancelation, which may be interpreted as a last-minute market signal that the prices for the services provided are incorrectly valued.

Another problem businesses can encounter using traditional appointment booking methods is that they may have a high volume of clients for the more opportune or wanted time slots, because of factors such as sleep schedules, weekends, work, school, or holidays and a low volume of clients at other times. The disparities in high volume times and low volume times lead to a longer waitlist of clients who are looking to book a particular time or lost clients because they are not incentivized to select other times. The disparities may also lead to lost profits and inefficiencies in the overall process because clients on the waitlist could have all been booked if the clients were evenly arranged between all time slots instead of remaining on the waitlist.

On the other side, clients are looking for businesses that provide online appointment scheduling. Clients have become frustrated with waiting on hold and the inconvenient office hours related to scheduling appointments by phone or in person. They have also become more comfortable using their smart devices to navigate through appointment booking options because of the familiarity of the process. Clients are also less likely to miss appointments with reminders by text or an app notification through their phone than they are compared to phone calls or email reminders. Thus, exists a need for an appointment scheduling process that is more predictable, secure, and reliable to clients while eliminating manual work and overhead for businesses as well as allowing for more accurate advertisement targeting various clients.

SUMMARY

The present disclosure recognizes the unsolved need for an appointment scheduling system and method that offers an efficient way for multiple clients to schedule appointments for various types of businesses and with the businesses' employees through an easily accessible software application instead of by phone or in person. The various client appointment bookings may then appear on a principal calendar where updates to the principal calendar are shown in real time to provide a seamless appointment scheduling process between businesses, employees, and clients.

In operation, the system will act as a digital Rolodex for clients and will be their primary way to book appointments for services they need for anything from doctor treatments to hair salon appointments to golfing tee times. Clients may also be provided with live updates of the location of the businesses and their employees when providing goods or providing services for the client to improve convenience and provide the clients greater visibility into their deliveries.

For businesses, the system helps generate more revenue by ensuring appointments are not double booked and acquire new customers from a client's circle of influence. Businesses may also have more bookings generated by the application providing advertisements for the business appear more or less frequent depending on the volume of appointments in the calendar. Businesses may also be provided with live updates of the location of the clients to plan accordingly.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items" may indicate the presence of only one item, or may indicate more items. Thus, the term "set" may be equivalent to "one or more" as used herein.

Figure 1:
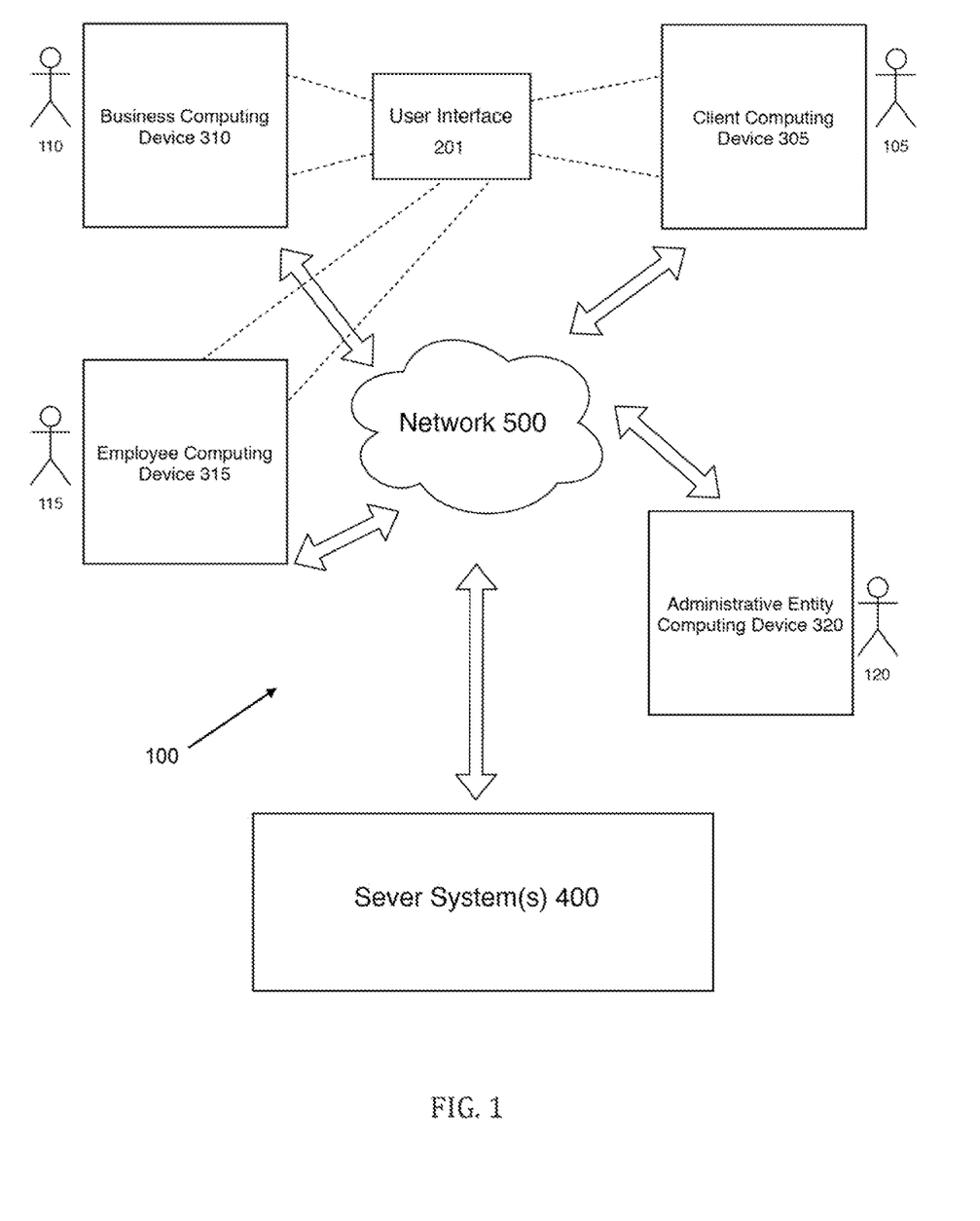
FIG. 1 depicts a block diagram of an appointment scheduling system.

FIG. 1 is a block diagram of appointment scheduling system 100 constructed in accordance with the principals of the current invention. Appointment scheduling system 100 may include one or more clients such as clients 105, one or more businesses such as businesses 110, and one or more employees such as employees 115. Clients 105, businesses 110, and employees 115 may be located in various physical locations that are either located apart or are located in the vicinity of one other. Clients 105, businesses 110, and employees 115 of appointment scheduling system 100 may access a user interface such as user interface 201 using a client computing device such as client computing device 305, a business computing device such as business computing device 310, and an employee computing device such as employee computing device 315. User interface 201 may have a plurality of buttons or icons that are selectable through user interface 201 by user 101 to instruct appointment scheduling system 100 to perform particular processes in response to the selections.

Client computing device 305, business computing device 310, and employee computing device 315, may be in communication with one or more servers 400 such as server 400 via one or more networks such as network 500. Server 400 may be located at a data center or any other location suitable for providing service to network 500 whereby server 400 may be in one central location or in many different locations in multiple arrangements. Server 400 may comprise a database server such as MySQL® or Maria DB® server. Server 400 may have an attached data storage system storing software applications and data. Server 400 may receive requests and coordinates fulfillment of those requests through other servers. Server 400 may comprise computing systems similar to user computing device 301.

In one or more non-limiting embodiments, network 500 may include a local area network (LAN), such as a company Intranet, a metropolitan area network (MAN), or a wide area network (WAN), such as the Internet or World Wide Web. Network 500 may be a private network, a public network, or a combination thereof. Network 500 may be any type of network known in the art, including a telecommunications network, a wireless network (including Wi-Fi), and a wireline network. Network 500 may include mobile telephone networks utilizing any protocol or protocols used to communicate among mobile digital computing devices (e.g. computing device 104), such as GSM, GPRS, UMTS, AMPS, TDMA, or CDMA. In one or more non-limiting embodiments, different type of data may be transmitted via network 500 via different protocols. In further non-limiting other embodiments, client computing device 305, business computing device 310, and employee computing device 315, may act as standalone devices or they may operate as peer machines in a peer-to-peer (or distributed) network environment.

Network 500 may further include a system of terminals, gateways, and routers. Network 500 may employ one or more cellular access technologies including 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

Appointment scheduling system 100 may also include one or more administrative entities such as administrative entity 120. While administrative entity 120 is depicted as a single element, communicating over network 500, administrative entity 120 in one or more non-limiting embodiments may be distributed over network 500 in any number of physical locations. Administrative entity 120 may manipulate the software and enter commands to server 400 using any number of input devices such as keyboard and mouse. The input/output may be viewed on a display screen to administrative entity 120.

Figure 2:
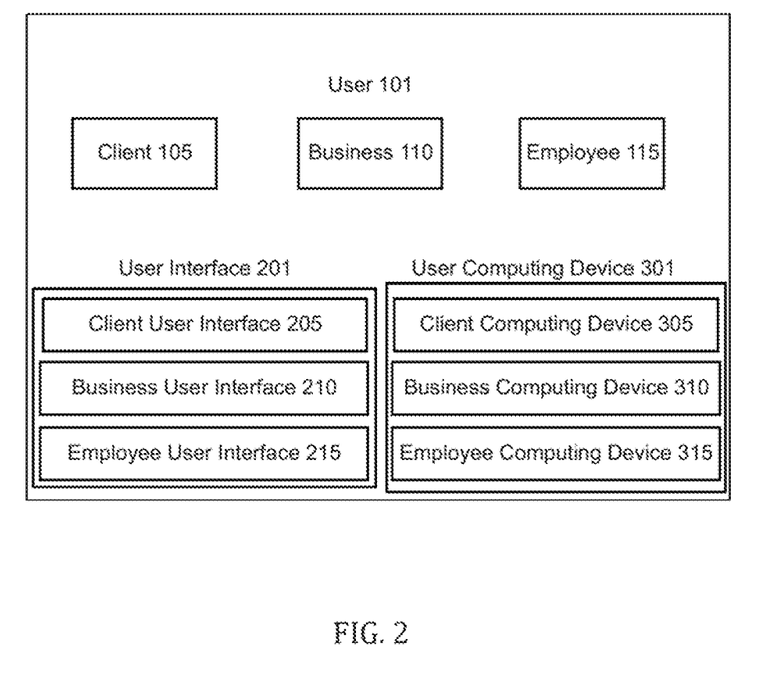
FIG. 2 depicts a block diagram displaying the various types of users.

Clients 105, businesses 110, and employees 115 may be users such as users 101, as illustrated in FIG. 2, of appointment scheduling system 100 whereby clients 105 may have the capacity to function as a client 105 seeking to schedule appointments with businesses 110 and as a business 110 or employee 115 providing access to their services to other clients 105. Business 110 or employee 115 may also have the capacity to function as a client 105.

Though clients 105, businesses 110, and employees 115 may be users 101 with the same computing device, such as user computing device 301 and user interface 201, they may also have unique user computing devices 301 specifically tailored to the processes they wish to carry out on appointment scheduling system 100. For instance, clients 105 of system 100 may access a specific user interface such as user interface 205 of system 100 using a client computing device such as client computing device 305. While in a similar manner, businesses 110 in some embodiments may access a specific business user interface such as business user interface 210 using a business computing device such as business computing device 310 and employee 115 may access a specific employee user interface such as employee user interface 215 using an employee computing device such as employee computing device 315. Client computing device 305, business computing device 310, and employee computing device 315, may be any type of user computing device 301 that typically operates under the control of one or more operating systems, which control scheduling of tasks and access to system resources.

Figure 3:
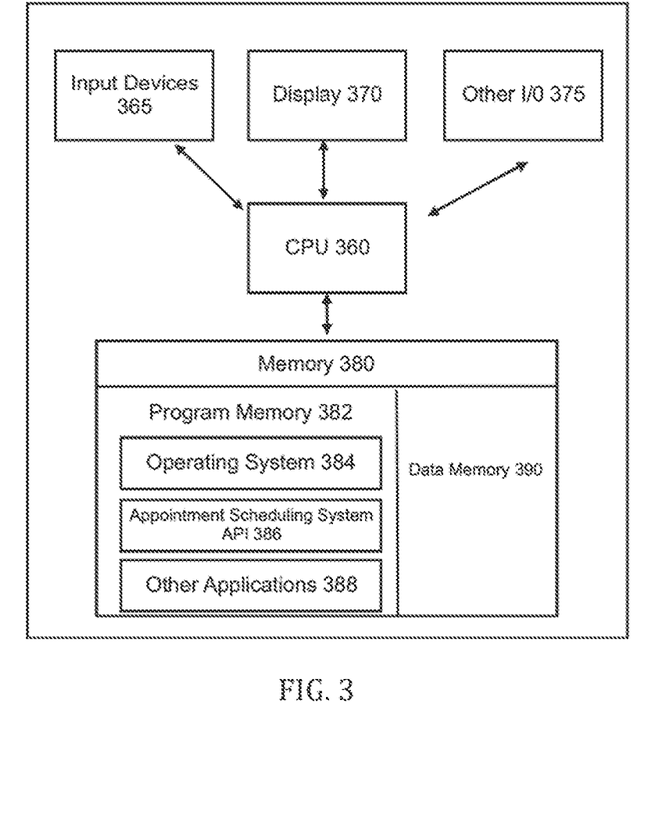
FIG. 3 depicts the components of a computing device.

One or more embodiments of user computing device 301 is further detailed in FIG. 3. User computing device 301 may comprise hardware components that allow access to edit and query appointment scheduling system 100. User computing device 301 may include one or more input devices such as input devices 365 that provide input to a CPU (processor) such as CPU 360 notifying it of actions. The actions may be mediated by a hardware controller that interprets the signals received from input device 365 and communicates the information to CPU 360 using a communication protocol. Input devices 365 may include but are not limited to a mouse, a keyboard, a touchscreen, an infrared sensor, a touchpad, a wearable input device, a camera- or image-based input device, a microphone, or other user input devices known by those of ordinary skill in the art.

CPU 360 may be a single processing unit or multiple processing units in a device or distributed across multiple devices. CPU 360 may be coupled to other hardware devices, such as one or more memory devices with the use of a bus, such as a PCI bus or SCSI bus. CPU may communicate with a hardware controller for devices, such as for a display 370. Display 370 may be used to display text and graphics. In some examples, display 370 provides graphical and textual visual feedback to a user. In some implementations, display 370 may include an input device 365 as part of display 370, such as when input device 365 is a touchscreen or is equipped with an eye direction monitoring system. In some implementations, display 370 is separate from input device 365. Examples of display 370 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Other I/O devices such as I/O devices 375 may also be coupled to the processor, such as a network card, video card, audio card, USB, FireWire or other external device, camera, printer, speakers, CD-ROM drive, DVD drive, disk drive, or Blu-Ray device.

CPU may have access to a memory such as memory 380. Memory 380 may include one or more of various hardware devices for volatile and non-volatile storage and may include both read-only and writable memory. For example, memory 380 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 380 is not a propagating signal divorced from underlying hardware; a memory is thus non-transitory. Memory 380 may include program memory such as program memory 382 capable of storing programs and software, such as an operating system such as operating system 384, appointment scheduling system API such as appointment scheduling system API 386, and other computerized programs or application programs such as application programs 388. Memory 380 may also include data memory such as data memory 390 that may include database query results, configuration data, settings, user options or preferences, etc., which may be provided to program memory 382 or any element of user computing device 301.

User computing devices 301 such as client computing device 305, business computing device 310, and employee computing device 315 may in some embodiments be mobile computing devices such as an iPhone, Android-based phone, or Windows-based phone, however, this is non-limiting and they may be any computing device such as a tablet, television, desktop computer, laptop computer, gaming system, wearable device electronic glasses, networked router, networked switch, networked, bridge, or any computing device capable of executing instructions with sufficient processor power and memory capacity to perform operations of appointment scheduling system 100 while in communication with network 500. Client computing device 305, business computing device 310, and employee computing device 315, may have location tracking capabilities such as Mobile Location Determination System (MLDS) or Global Positioning System (GPS) whereby they may include one or more satellite radios capable of determining the geographical location of computing device.

Figure 4:
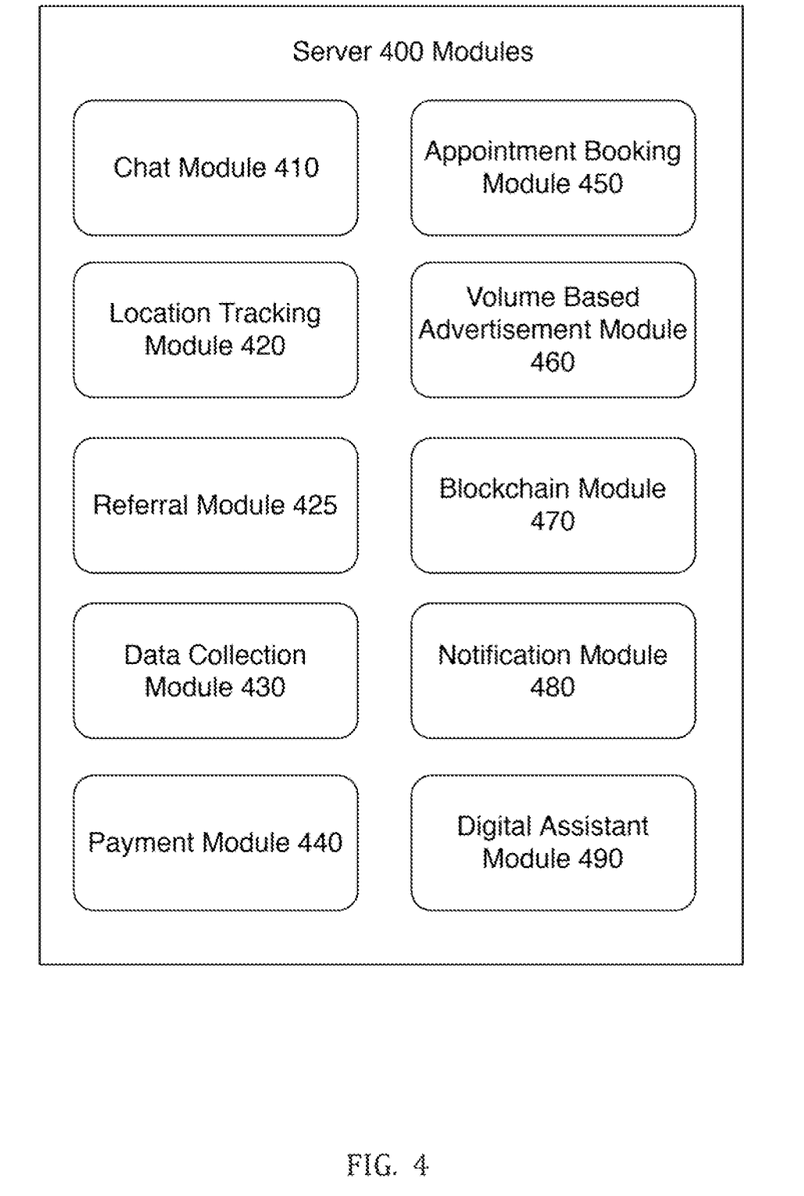
FIG. 4 depicts a block diagram showing the modules of server.
Figure 5:
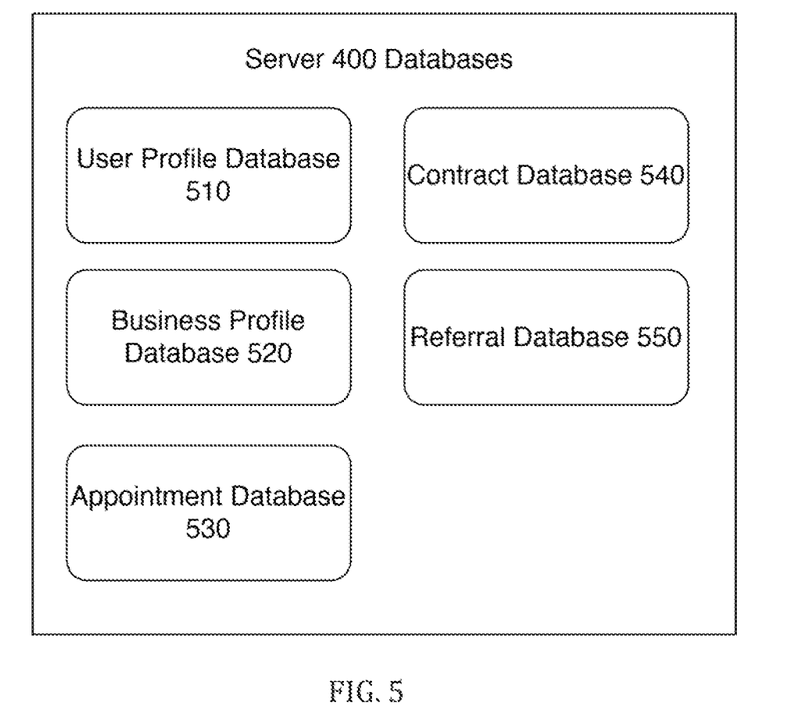
FIG. 5 depicts a block diagram displaying the databases of server.

Server 400 may comprise a number of modules as illustrated in FIG. 4 that provide various functions related to appointment scheduling system 100 using one or more computing devices similar to user computing device 301. Modules may include a chat module 410, a location tracking module 420, a referral module 425, a data collection module 430, a payment module 440, a appointment booking module 450, a volume-based advertisement module 460, a blockchain module 470, a notification module 480, and a digital assistant module 490. Modules may be in the form of software or computer programs that interact with the operating system of server 400 whereby data collected in databases, as illustrated in FIG. 5, may be processed by one or more processors within server 400 or another component of appointment scheduling system 100 as well as in conjunction with execution of one or more other computer programs. Server 400 may comprise a number of databases, which may include a user profile database 510, a business profile database 520, an appointment database 530, a contract database 540, and a referral database 550.

Modules may be configured to receive commands or requests from user computing devices 301, server 400, and outside connected devices over network 500. Server 400 may comprise components, subsystems, and modules to support one or more management services for appointment scheduling system 100. For example, server 400 may include chat module 410 operative to maintain presence information for one or more users 101 and to provide chat functionality allowing users 101 to communicate messages in a chat through appointment scheduling system 100.

Clients 105, businesses 110, and employees 115 may initially register to become a registered user 101 associated with appointment scheduling system 100 and appointment scheduling system API 386. Appointment scheduling system 100 may be downloadable and installable on user computing devices 301 through an API. In one or more non-limiting embodiments, appointment scheduling system 100 may be preinstalled on user computing devices 301 by the manufacturer or designer. Further, appointment scheduling system 100 may be implemented using a web browser via a browser extension or plugin.

Upon initially signing up with appointment scheduling system 100 through appointment scheduling system API 386, user 101 may be prompted to provide an email address. After entering an email address, user 101 may be presented with a text window interface whereby user 101 may enter their name, username, password, phone number and address. In one or more non-limiting embodiments, location of user 101 may be verified by location tracking module 420 using the global positioning system (GPS) capabilities of client computing device 305, business computing device 310, or employee computing device 315. Notification module 480 then may generate a code that is transmitted to user's 101 selected email or user computing device 301 by text message whereby user 101 may verify their account by entering the generated code into a text block window.

User 101 may opt-in for various appointment scheduling system 100 notifications to be transmitted by notification module 480. User 101 may opt-in to allow the appointment scheduling system 100, through appointment scheduling system API 386, to notify user 101 when certain events occur, such as events related to other users 101. In further embodiments, user 101 may establish one or more different profiles whereby the different profiles may individually have appointments scheduled. For instance if a mother wants to book appointments for her son, Matt, she could establish a second profile for him whereby he may have his own set of appointments separate from her.

User 101 may authorize appointment scheduling system 100 to access an address book or other contacts list of user 101. The address book may be stored on client computing device 305, business computing device 310, employee computing device 315 device, or a cloud network through a third-party service provider. In one or more non-limiting embodiments, user 101 may be required to provide credentials to the third-party service provider to allow access by appointment scheduling system 100. User 101 may also authorize social network access whereby when a social network service is linked to appointment scheduling system 100, access may be granted to various accounts of user 101 and importing of data from those accounts may occur such as to import one or more social network contacts. If user 101 authorizes access, data collection module 430 collects or otherwise accesses certain address book information and stores the information in user profile database 510. Data collection module 430 may then proceed to match contacts with other users who have granted similar access to appointment scheduling system 100. Matching may occur through the use of phone numbers, email addresses, or social network identification tags.

Upon successful authentication of user 101, a user profile page may be generated whereby the user profile page may be visible to user 101 and other users 101 on appointment scheduling system 100. User profile pages may be modified, deleted, written to, or otherwise administered by their respective user 101. Administrative entity 120 may modify or delete a user profile page, for example, as a result of inactivity or inappropriate action. Display to user 101 through user interface 201 may comprise a number of different subpages viewable or accessible through user interface 201 by selecting one or more tabs. Tabs may include a profile, business, notifications, calendar, and search tabs which may be displayed though user interface 201 in a region that displays the tabs no matter which tabs have been selected by user 101.

The profile tab may display the user profile page of designated user 101 and comprise a number of different subpages viewable or accessible by selecting one or more tabs. The user profile page may include a details tab for displaying information related to user 101, such as but not limited to name, user name, address, description, and one more photographs. User 101 may also be presented with the option to select particular photographs to be collected by data collection module 430 whereby data collection module 430 then displays these photographs on the details tab. The user profile page may include a favorites tab for displaying businesses 110 that user 101 has favorited through appointment scheduling system 100 and information related to businesses 110 such as address, pictures, and number of jobs completed between user 101 and business 110 through appointment scheduling system 100. The user profile page may include a friends tab for displaying other users 101 who have made a mutual connection through appointment scheduling system 100 with user 101.

The user profile page may include a posts tab whereby notification module 480 may retrieve notifications associated with selected user 101 or friends of user 101 and apply this data to provide a feed section to access posts created by user 101 and other users 101. Posts that appear on the feed section may be displayed in chronological order with the newest posts positioned at the top of the feed section while older posts may be displayed by scrolling down on the feed section or by viewing subpages associated with the feed section. User interface 201 may present user 101 with the ability to create additional posts whereby user 101 may express themselves or announce information related to themselves.

User 101 may also upload photos or videos as a post or to accompany a post whereby photographs uploaded by user 101 are collected by data collection module 430 whereby data collection module 430 stores photographs on user profile database 510 and then displays the video or photos. User interface 201 may present user 101 with filtering criteria of to whom the newly created post is visible to, such as all users 101, users 101 who are friends with user 101, or no other users 101 whereby notification module may then only display the post to other users 101 matching this criteria. In one or more non-limiting embodiments, depending on user privacy settings, which may be set or modified through user interface 201 by user 101 via the user profile page, any action by a user 101 may be viewable to other users 101, such as but not limited to likes, follows, and reviews.

Notifications tab of user profile page may include a drop down list related to events whereby notification module 480 may retrieve notifications associated with user 101 and other users 101 whereby notification module 480 may apply this data to provide notifications pertaining to user 101 as well as the actions of other users 101, whereby a status indicator may appear directly on or proximate to the notifications tab to notify user 101 when one or more notifications have occurred.

User profile page may include a selectable button to add other users 101 as friends. After selecting the add friend button, user interface 201 may display a search window whereby user 101 may search for another user 101. A search request having a character string may be entered into the search window by user 101 whereby data collection module 430 may receive this request and then display one or more users 101, identified using their name or other meta data related to user 101. If user 101 wants to add second user 101 to their list of friends, user 101 selects the option to request to add second user 101. In other non-limiting embodiments, user 101 may select this option by selecting second user 101 when navigating through appointment scheduling system 100. For instance, if a post by another user 101 is displayed to user 101 on a business profile page.

In response to the request by user 101, notification module 480 generates a friend request and notifies second user 101 of the request by user 101 and displays the request on second user's 101 notification tab on user interface 201. If second user 101 receiving incoming friend request responds to the notification, second user 101 is presented with an accept request decision and a decline request decision. Accepting friend request initiates an action whereby data collection module 430 stores this action on user profile database 510 whereby notification module 480 may present actions matching second user's 101 privacy settings for users 101 who are friends. If second user 101 receiving the request declines the request, the request is removed from the notifications tab. Second user 101 receiving the request may optionally stop future requests being sent from user 101 whereby notification module 480 prevents all future requests from user 101 to second user 101.

The user profile page may include a chat tab for displaying a chat messaging interface, generated by chat module 410, to user 101. In one or more non-limiting embodiments, the chat messaging interface displayed to user 101 has controls through user interface 201 that allow user 101 to establish a chat session with a second user 101, such as a business 110, other client 105, or employee 115. After selecting the chat tab, the chat module displays a list of current chats with other users 101.

After selecting business tab, user 101 may be presented with a selectable button through user interface 201 for initiating a new business. User 101 may be presented this option during initial registration as a verified user or at any time during a session including after already creating a business 110. After selecting this option, user 101 may be presented with a screen whereby user 101 may be prompted to insert information pertaining to business 110, such as business name, business address, service area radius, business phone number, business website, license number, a short description, a long description, and type of payment accepted. Additionally user interface 201 may allow user 101 to upload associated data including any file attachments, images, or videos directly from camera on user computing device 301 or a photo library stored on user computer device 301. Associated data may be the business logo as well as photos or videos depicting the business location including the indoors and outdoors, a menu, or any other pictures displaying the services provided by business 110.

User interface 201 may also display a drop-down menu whereby user 101 may select available times during the week that business 110 is open to provide services to clients 105. For example user 101 may select that business 110 has available working hours on Monday through Friday at 8 am to 8 pm while on Saturday and Sunday at 10 am to 5 pm. In one or more non limiting embodiments, user interface 201 may also include a selectable "add busy" option to add a new busy entry to business 110 for times that businesses 110 cant take clients 105 either because of national holidays, work retreats, or the appointment has already been booked on another platform or through another medium. Data collection module 430 may then collect this information and store the information in the business profile database 520.

User interface 201 may also provide user 101 with a search text window, whereby data collection module 430 displays to user 101 categories and subcategories to be used to classify their business listings to facilitate searching of businesses 110 by clients 105. Drop down menus may be presented with a pre-defined list of categories. User interface 201 may also provide user 101 with a text window allowing user 101 to enter one or more services provided by the business 110 and how long it takes the business 110 to provide the service, as well as the price for the services. User interface 201 may provide user 101 with a text window allowing user 101 to enter how many clients 105 may register for this specific time period.

User interface 201 may also provide user 101 with a text window allowing user 101 to enter one or more employees 115 who provide the services. This provides more efficient appointment scheduling since businesses 110 may provide multiple services whereby servicing clients looking for a specific service may take longer than other clients wanting another type of service. For example, in the hair salon industry, a haircut may take 30 minutes while a hair dye treatment may take 90 minutes. This information is then collected and stored into business profile database 520 by data collection module 430.

Business 110 may also be presented with options to select a buffer time between each service so that appointments are not booked one right after another. For example, if a 15 to 30 minute buffer time has been set before and after a specific service, users 101 cannot select those times to book another appointment immediately following the current appointment.

In one or more non-limiting embodiments, user 101 may search for their business 110 with the intent to claim and verify business 110 as their own. Businesses 110 may come from an existing database stored on business profile database 520 of server 400 or a third-party database that server 400 is in communication with, whereby server 400 may receive results from third-party database. User interface 201 may present to user 101 a search window whereby a search request having a character string may be entered, where one or more businesses 110 may be identified using name, the type of goods or services provided by business 110, or other metadata pertaining to business 110. Data collection module 430 may then retrieve business profile data related to the search from business profile database 520 and display the results to user 101.

For example, user 101 may be Chase who wants to locate his auto repair service business named "Chase's Tires." User 101 may type "Chase's Tires" with a search request through user interface 201. Accordingly, a list of results of nearby businesses 110 named "Chase's Tires" may be provided to user 101 in response to their search. If business 110 is on the list of results, user 101 may select a button to verify they are an owner or representative of business 110 and continue adding information about business 110, such as business address, business phone number, business website, a short description, a long description, type of payment accepted, available working hours, and additional data, such as photos and videos. If business 110 is not on the list, user 101 may select a button to create a new business 110 in a similar fashion to the method already discussed. A code may also be generated and transmitted to user's 101 email or user computing device 301 by text message, whereby user 101 may verify business 110 by entering the generated code into a text block window.

In the event a second user 101 has already verified ownership of this business 110. User 101 may be presented with selectable button to request ownership whereby notification module 480 may receive this request and present for display the request to the second user 101 who has already claimed business 110 as well as the administrative entity 120 who may then determine the appropriate user 101 for business 110.

Upon successful authentication of business 110, a business profile page may be generated by data collection module 430 using information stored on business profile database 520 whereby business profile page may be visible to user 101 who has verified ownership and other users 101 on appointment scheduling system when navigating through appointment scheduling system 100. If multiple businesses 110 are created or owned by user 101, user 101 may be presented with a drop down menu whereby they may select a specific business 110, the data collection module 430 receiving this request and displaying business 110 selected by user 101. Business profile pages may be modified, written to, or otherwise administered by, their respective owner (user 101 who has verified they are the owner or representative of business 110). Administrative entity 120 may modify or delete a business profile page, for example, as a result of inactivity or inappropriate action on the behalf of business 110 or user 101.

The business profile page may comprise a number of different subpages viewable or accessible by selecting one or more tabs. The business profile page may include a posts tab whereby notification module 480 may retrieve notifications associated with business 110 and users 101 and apply this data to provide a feed section to access posts created by business 110 and other users 101. User interface 201 may present user 101 with ability to create additional posts whereby user 101 may express themselves or announce information related to businesses 110. Posts that appear on the feed section may be arranged in chronological order with the newest posts positioned at the top of the feed section while older posts may be viewed by scrolling down on the feed section or by viewing subpages associated with feed section.

User 101 may also upload photos or videos as a post or to accompany a post. User interface 201 may present to user 101 with filtering criteria of to whom the newly created posting is visible to, such as but not limited to: all users 101, users 101 who are following business 110, users 101 who have already completed appointments with business 110, or no other users 101 whereby notification module 480 may then only display posts to users 101 matching the selected filtering criteria. In one or more non-limiting embodiments, depending on business's 110 privacy settings, which may be set or modified by the user 101 via the business profile page, any action that a user 101 takes with respect to business 110, such as following business 110, or posting about business 110, may be displayed in posts tab, which may be viewable to other users 101.

The business profile page may include a selectable button to add employees 115 to business 110. After selecting the add employee button, user interface 201 may display a search window whereby business 110 may search for an employee 115 from the pool of users 101. A search request having a character string may be entered into the search window by business 110 whereby data collection module 430 may receive this request and then display one or more employees 115, identified using their name or other metadata related to employee 115. If business 110 wants to add an employee 115 working for business 110 to business's 110 employee list, business 110 selects the option to request that employee 115 to the list of business's employees.

In response to the request by business 110, notification module 480 generates an employee request and notifies employee 115 of the request by business 110 and displays the request on employee's 115 notification tab of user profile on user interface 201. If employee 115 receiving incoming employee request responds to the notification, employee 115 is presented with an accept request decision and a decline request decision. Accepting employee request initiates an action whereby data collection module 430 stores this action on user profile database 510 and business profile database 520 whereby data collection module 430 may present employee 115 on business's 110 employee list and vice versa whereby appointment booking module 450 may also present employee 115 when booking an appointment. If employee 115 receiving the request declines the request, the request is removed from the notifications tab. Employee 115 receiving the request may optionally stop future requests being received from business 110 whereby notification module 480 prevents all future requests from business 110 to employee 115.

Business profile page may include a details tab for displaying information related to the business 110, such as but not limited to business name, services offered, description, photos, average ratings received from clients 105, and number of jobs completed through appointment scheduling system 100 as well as selectable message button, follow button, share button, and book now button for clients 105 to interact with. The follow button may be selected to start following business 110 whereby business 110 may appear on the status feed and favorites list of user 101 who has followed business 110. Similarly, a user 101 can go to a profile page of a second user 101 and select to follow or friend second user 101. User 101 may also be presented with option to select particular photographs to be uploaded and displayed on the details tab. Business profile page may include a services & hours tab for displaying information related to the services provided by business 110 as well as the operating working hours for business 110. Data collection module 430 may retrieve associated data with users 101 who have followed business 110 whereby data collection module may 430 apply this data to provide a list of these users 101 for business 110 to view.

After selecting the book now button, a client 105 may be presented with a display whereby client 105 may schedule an appointment with selected business 110. Data collection module 430 may retrieve appointment data associated with selected business 110 whereby data collection module 430 may apply this data to a calendar template to provide a viewable calendar for client 105 to select a specific date on the calendar and view available times for business 110. Data collection module 430 may then retrieve business data associated with selected business 110 whereby data collection module 430 may apply this data to display to user a list of services and possible duration for the services. User interface 201 may display a drop down menu whereby user 101 may select a specific service of business 110 they wish to book an appointment and the duration they wish for the service. Data collection module 430 may retrieve business data associated with employees 115 of the business 110 whereby client 105 may view and select a particular employee 115 to provide the selected service.

Client 105 may further specify additional information related to the appointment, such as for example any special allergies user 101 might have that may detrimentally affect them during a hair salon visit. User interface 201 may also display a selectable button for if user 101 wishes this to be a reoccurring appointment, such as every Tuesday for the next month whereby client may be notified by notification module 480 if one of these times are not available or business 110 only allows appointments that are within a certain date in the future. User interface 201 may then allow user 101 to deselect these times or return to a previous step. User interface 201 may also allow multiple users to schedule a single appointment. After confirming the appointment, appointment booking module 450 may collect and store the appointment data in user profile database 510, business profile database 520, and appointment database 530. Business 110 may also manually add appointments to the calendar for their business 110 or employees 115 with one or more clients 105 in a similar fashion to client's 105 appointment scheduling process, whereby business 110, employees 115, and any selected clients 105 still may be presented appointment on a calendar and may still receive notifications. In other non-limiting embodiments users 101 may book and schedule appointments with one or more other users 101 in a similar manner regardless if user 101 is a client 105 or business 110.

Figure 6:
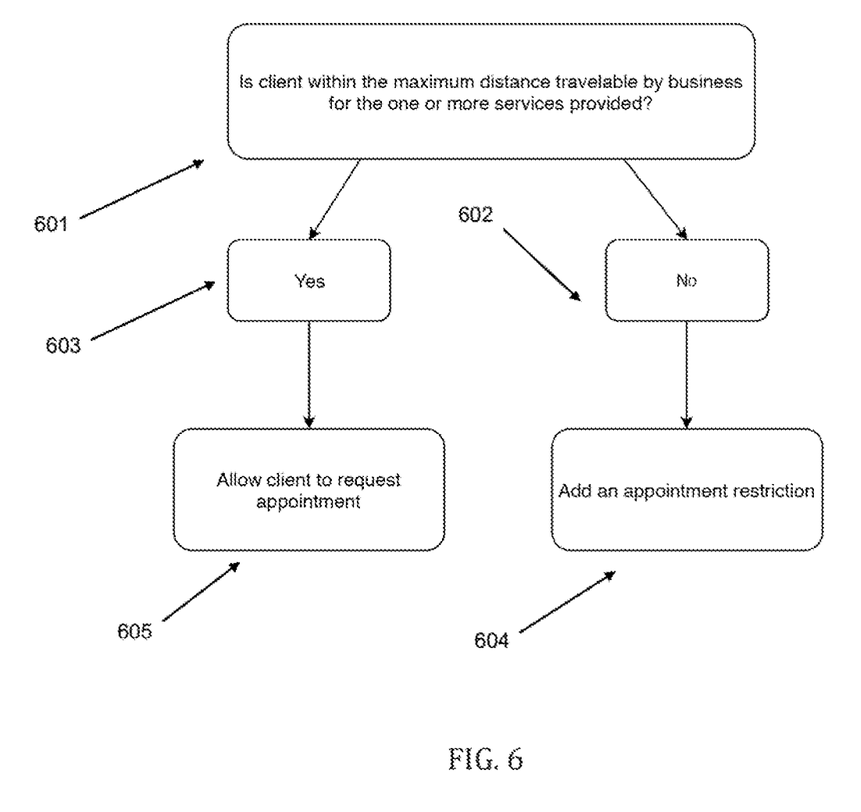
FIG. 6 depicts a flowchart of a user's location verification process.

In some embodiments, as illustrated in FIG. 6, location tracking module 420 may determine whether client 105 using client computing device 305 is within a predetermined maximum distance of business 110 at step 601. If client 105 is not within the predefined maximum distance based on business's 110 settings at step 602, client 105 may be notified by notification module 480 that they are not in business's 110 operating area at step 604. For example, a pop-up window or the schedule appointment selectable button may be unselectable and also have an indicator of its status, such as appearing greyed out. If client 105 is within the predetermined maximum distance based on business's 110 settings at step 603, client 105 may be allowed to book an appointment at step 605. In further embodiments, after client 105 has selected an appointment, data collection module 430 may determine if the appointment passes the restrictions of one appointment per time period. If the appointment does not pass the restrictions, an appropriate message may be displayed to client 105 notifying client 105 that they have doubled booked their appointment.

Notification module 480 may generate one or more actions in response to a new appointment booking. Notification module 480 may also generate one or more actions in response to changed or updated events pertaining to created appointment booking, such as when a client or business modifies or cancels an appointment. Notification module 480 may assemble an automatically generated email, text, application notification, or other notification message that includes client 105, business 110, employee 115, services provided, date, time, and other information associated with a booked appointment whereby the notification may be transmitted to client 105, business 110, and employee 115.

Notification module 480 may generate synchronization messages, such as an email message, text message, or calendar invitation for each user 101 related to the appointment booking causing the appointment booking to be included in a local personal information manager application connected to appointment scheduling system 100, such as Microsoft Outlook and Google Calendar. In one implementation, the synchronization message may include a calendar data exchange file, such as an iCalendar (.ics) file in compliance with IETF RFC 5545.

Notification module 480 may send reminders to automatically alert client 105, business 110, and any employees 115, of a pending appointment. Default reminder settings may be overridden and configured based on the preference of users. Default reminder settings may be configured to provide automatic reminders at one week, on business day, and one hour prior to the designated time of appointment booking. Message recipients, message formats, and reminder settings for individual managers may be configured based on the preference of users or administrative entity.

The business profile page may include a chat tab for displaying a chat messaging interface to user 101. In one or more non-limiting embodiments, the chat messaging interface displayed to user 101 has controls through user interface 201 that allow user 101 to establish a chat session with a second user 101, such as another business 110, a client 105, or employees 115 for business 110. After selecting the chat tab, user 101 may also be presented with a list of current chats with other users 101.

The search tab of the user profile page may display a search window whereby user 101 may search for a user such a specific client 105, employee 115, or a business 110 using a name or category of user 101. A search request having a character string may be entered into the search window by user 101 whereby one or more second users 101 may be identified using name, type of services provided, or other meta data related to second user 101. Further, the closest second users 101 matching the search request may be provided on a drop down list presented to user 101 whereby user 101 may select second user 101 and display their respective profile page. For example, if user 101 wants to locate a nearby hair salon to book a hair coloring appointment, user 101 may type "hair salon" into the search window. Server 400 may access business profile database 520 and return a list of hair salons.

In another example, if user 101 wants to locate a hair salon named "Blondie's," user 101 may type "Blondie's" with a search request. Accordingly, a list of hair salons named "Blondie's" may be provided to user 101 in response to their search. In a further example, if user 101 wants to locate another user named "Chad," user 101 may type in "Chad" into the search window. A list of "Chads" may be provided to user 101 in response to their search. Businesses 110 may be listed based on similarity to client's 105 search entry but also may be listed based on rating by clients or how completed their business profile page is whereby data collection module 430 determines a quality score from one or more weighted amounts of calculated profile attributes, such as photos, address, location, and name. The sum of all the weighted amounts is then normalized to determine the quality score of business 110. In other non-limiting embodiments second users may be listed based on when they joined appointment scheduling system 100, their activity level, if they have opted into to volume based advertisements, or how many times they have been charged a predetermined amount by appointment scheduling system 100 for volume based advertisements, which will be discussed later in the specification.

User 101 may input additional text into the search window or changes to the existing search request through user interface to receive an updated list of users 101 based on the newly entered text. User 101 may also be presented with the ability to adjust and select filtering parameters, such as specific categories, price, distance from user 101, already visited businesses 110, and/or establishment hours. Further, in some embodiments, these parameters as well as others may be automatically factored in when a search request is conducted, such as user 101 searching for hair salons whereby a list of hair salons are displayed that are in closest proximity to user.

The calendar tab of the user profile page may display user's 101 appointments for a set period of time, such as a month or week. In response to a request to view user's 101 calendar, server 400 may retrieve appointment booking data associated with user 101 whereby server 400 may apply this data to a calendar template to provide a viewable calendar for user 101 with pending appointment bookings. The name of user 101 or other details may be indicated on the calendar interface. If user 101 has multiple calendars, such as for multiple businesses 110 they own or multiple profiles associated with user 101, user 101 may be presented with an option to specify which calendar should be viewable or to display all appointments from multiple businesses 110 and profiles on one calendar with different indicators, such as color, shapes, font, or change in appearance to distinguish themselves from one another. In one or more non-limiting embodiments, user 101 may select among multiple templates, designs, or formats in which appointment booking data may be presented. User interface 201 may provide user 101 with options to share one or more calendars with a friend or other user as well as establishing a group whereby users 101 in the group may view one another's calendar (i.e. a family).

The user profile page and business profile page may include a selectable button for displaying past transactions, as well as pending appointments and past referrals, whereby appointment booking module 450 may retrieve appointment booking data associated with client 105 or business 110 and apply this data to provide a list of past appointment bookings and pending bookings receipts. Client 105 or business 110 may select the business 110 or client 105 from the transaction presented whereby they may be taken to the client profile page or business profile page.

Independent of the user profile page but displayed on user interface 201, appointment scheduling system 100 may generate and display content, such as advertisements, recommendations, sponsored content, games, quizzes, reminders, and events. However, this is non-limiting and content is not limited to a particular position for display to users 101. For example, content may be displayed on the left, top, or right of the user profile page.

After an appointment has been scheduled, notification module 480 may also present the location a number of clients 105, business 110, and employee 115 who have a scheduled appointment at a designated time, such as one hour before the appointment. The presentation may be in the form of a pop up window displayed to each user or displayed on its own tab. Client 105, business 110, and any employee 115 may also be presented with geo-spatial environment having a virtual map of the geographical location in which employee 115, client 105, and business 110 are located. The virtual map may have geography and topography, which parallels the geography and topography of the physical real world. For instance, a range of longitudinal and latitudinal coordinates defining a geographic area or space in the real world may be mapped to a corresponding range of longitudinal and latitudinal coordinates defining a virtual space on the virtual map as well as each individual coordinate in the range. The graphical map may be displayed with client 105, business 110, and employee 115 displayed as markers, pins, or identifiers at their respective locations.

Client 105, business 110, and employee's 115, position on the virtual map corresponds to their position in the real world. For instance, client 105 may be located at the corner of Elm and Maple in the real world, which has a corresponding position on the virtual map pertaining to the corner of Elm and Maple. Location tracking module 420 may analyze client 105, business 110, and employee's 115 position as they navigate the range of geographic coordinates in the real world such as when they are moving to their destination.

In one or more non-limiting embodiments, user interface 201 may present user with an option of sharing location at any time to a specific user, such as a client 105, employee 115, business 110, friends of user 101, or all users 101, whereby a second user 101 may be provided a selectable option to view user's 101 location. In further embodiments, users 101 may request to view a second user's 101 location. In response to the request by user 101, notification module 480 generates a location request and notifies second user 101 of the request by user 101 and displays the request on second user's 101 notification tab on user interface 201. If second user 101 receiving incoming location request responds to the notification, second user 101 is presented with an accept request decision and a decline request decision whereby if second user 101 accepts the location request, notification module 480 may present the location of second user 101 to user 101. This allows users 101 to track each other without making appointments, which is beneficial for when friends start up to chat and want to meet up spontaneously. In further embodiments, user 101 and second user 101 may mutually track the location of one another. For example, friends may want to track each other at a meeting location.

Appointment booking module 450 may generate an invoice that is transmitted for display to business 110 and client 105 whereby the invoice may be generated utilizing one or more templates for invoices or other contracts stored on contract database 540. Templates may have generated information from associated data retrieved from data collection module 430, such as business information, client information, services, description of service, amount for each service, discounts, sales, tax, total price, notes, and payment method. Client 105 and businesses 110 may elect to have the invoice transmitted to them as a printed receipt, e-mail, text message, hyperlink, or other type of message. An invoice may be generated at any time during the appointment booking process, such as 30 minutes before or after the appointment depending on the circumstances.

Appointment scheduling system 100 may have a payment module 440 that communicates with at least one third-party payment facilitator over network 500. Payment facilitators may include credit or debit card providers and billing service providers that perform invoicing and related functions.

For example, once confirming an appointment or after the appointment has completed, data collection module 430 may retrieve business data associated with business 110 from business profile database 520 and appointment booking data associated with the appointment booking from appointment database 530 whereby data collection module 430 may apply this data to display to client 105 the final summary for the appointment, including the estimated price information, subtotal, the individual prices for services, discounts, taxes, promotional coupon and gift card text entry fields, gratuity or tipping text entry fields, mode of payment drop down menus or text entry fields, and a calculated total including subtotal combined with taxes discounts and gratuity added. Client 105 may input their credit card or debit card information for a credit card or debit card using any card known in the art, including, without limitation an ATM card, a VISA®, MasterCard®, Discover®, or American Express® card in a credit card input field, or can alternatively use PayPal® Squarepay® or the like. Client 105 may also withdraw from appointment scheduling system 100 for the necessary funds.

When an appointment has been completed, users 101 such as client 105, business 110, and employees 115 may be presented through user interface 201 with a screen whereby user 101 may be prompted to rate other users 101 participating in the appointment through a drop down menu of selectable choices, such as the numbers 1 through 5 and one or more text windows to insert information along with the rating with a review whereby this rating and review may be displayed on user profile page of an associated user 101.

Appointment scheduling system 100 may have a referral module 425 to incentivize clients 105 to refer other clients 105 to businesses 110 in exchange for monetary compensation from appointment scheduling system 100, business 110, or employee 115 while also helping the business 110 or employees 115 receive more clients 105 by word of mouth. In one or more non limiting embodiments, a client 105 may be presented with the option on the business profile page to refer another client 105 whereby user interface 201 may display a search window where user 101 may search for and select one or more second users to receive a referral. In response to the referral by user 101, notification module 480 generates a referral and notifies second client 105 of the referral from user 101 and displays the request on second client's 105 notification tab on user interface 201.

If second client 105 receiving incoming referral responds to the notification, second client 105 is presented with an option to schedule an appointment with business 110 whereby if second client 105 books an appointment, referral module 425 generates a notification to business 110 of the referral. In one or more non-limiting embodiments, referral module 425 may transmit a commission to client 105 in the form of fund deposited in their appointment scheduling system account or other means known by those of ordinary skill in the art after the completed transaction of appointment booking between business 110 and second client 105. The referral is also stored in the referral database 550. In further embodiments, user interface 201 may provide an option for second client 105 to select a referring client 105 on payment screen or during any time of the appointment scheduling process.

Independent of the business profile page but visible when accessing a business profile page, appointment scheduling system 100 may display content such as one or more similar businesses 110 or recommended business 110 at the bottom of the business profile page to help clients 105 find a more appropriate business 110 at a quicker rate. However, this is non-limiting and content is not limited to any screen or particular position for display to users 101. For example, content may be displayed on the left, top, or right of the business profile page. In further non-limiting embodiments, similar or recommended business 110 may appear only if location tracking module 420 has determined that client 105 is outside a predetermined distance of business 110, whereby similar or recommended businesses 110 are within the predetermined distance. Recommended business 110 may also be displayed based on client's 105 text entered into search window.

Figure 7:
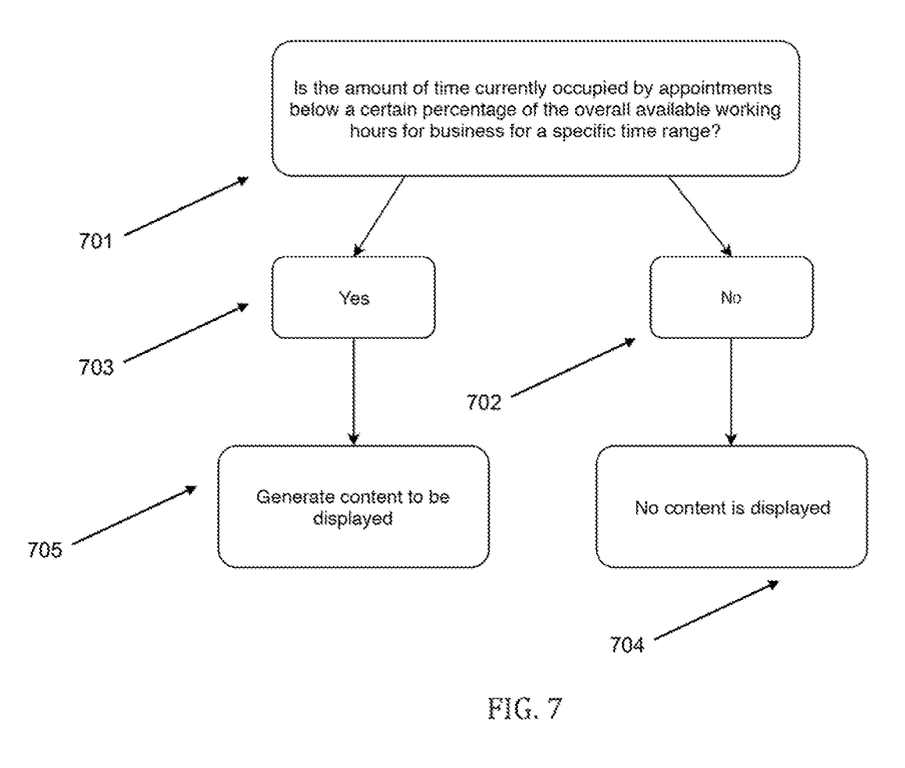
FIG. 7 depicts a flowchart of the volume-based advertising process.

Appointment scheduling system 100 may utilize volume-based advertisement module 460 whereby the type, amount, and how frequent advertisements may be displayed relating to a specific business 110 depend on the percentage of bookings currently on the calendar of business 110. User interface 201 may provide an option for business 110 to opt into volume-based advertisements whereby business 110 may be charged a predetermined amount any time an action occurs. Actions may be any number of occurrences, such as, as illustrated in FIG. 7, when the amount of time currently occupied by appointment bookings reaches or drops below a certain threshold percentage when divided by the overall available working hours for business 110 at step 701.

For example, when business 110 no longer has any available time slots for booking appointments, business 110 would not be charged any amount by appointment scheduling system 100. When the amount of time booked for appointments is over a predetermined percentage such as 50%, at step 702, no content is generated at step 704. However, when the amount of time booked for appointments is only at or less than a predetermined percentage, such as in step 703, the action to display advertisements may occur, at step 705 and thus business 110 is charged a predetermined amount.

As a result of action, volume based advertisement module 460 may display advertisements to clients 105 of business 110 whereby business 110 may automatically appear in content on user profile pages or other businesses profile pages. Clients 105 may also receive notifications by email, text, or push notifications related to business 110. Clients 105 may also be rewarded loyalty program points, a membership upgrade, access to premium services or benefits at no additional cost to client 105, a credit towards future services, a gift card, voucher, discount, or coupon (whereby either business 110 or appointment scheduling system offset the lost fees that would have been charged to client 105)

Volume based advertisement module 460 may also determine that an action may be justified for low demand time slots or services. Volume based advertisement module 460 may determine appropriate actions for less busier times and off peak days to help improve overall business by making appointments more evenly scheduled. For example, when the percentage of time currently occupied by appointment bookings (the amount of time currently occupied by appointment bookings divided by the overall available working hours for a business 110 times one-hundred percent) on Monday deviates a certain percentage from another day, such as Thursday, an action may occur and volume-based advertisement module 460 may incentivize clients 105 with advertisements or promotions directed to attracting clients 105 to Thursday.

Action may occur when the percentage of time occupied by appointment bookings has deviated from that of another business' 110 within a certain distance of business 110 (for instance >30%). This may help businesses lagging behind other companies in the area. This may be further specified for type of business and other factors that the businesses share. Volume based advertisement module 460 may incentivize clients 105 with advertisements, promotions, or notifications directed to attracting clients 105 to specific business 110 lagging behind including being presented on the business profile page for the other business 110 or on a search page.

Action may also occur when the percentage of time occupied by appointment bookings of one employee 115 registered with business's 110 has deviated from the percentage of another employee 115 or the average percentage booked time for all employees 115 for business 110 (for instance >30%). This may help bolster a specific employee who is lagging behind other employees so as to not have employees having significant downtime. Volume-based advertisement module 460 may incentivize clients 105 with advertisements, promotions, or notifications directed to attracting clients 105 to a specific employee 115 lagging behind.

Action may occur when another business 110 within a certain distance of business's 110 rating score, number of referrals, number of invoices, or total amount recorded in the invoices has deviated from another business 110. Volume-based advertisement module 460 may incentivize clients 105 with advertisements, promotions, or notifications directed to attracting clients 105 to specific business 110 lagging behind. Volume-based advertisement module 460 may utilize one or more trained machine learning algorithms that may be of any suitable form, and may include, for example, a neural network. A neural network may be software representing human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include, for example, a convolutional neural network, a deep neural network, or a recurrent neural network. Previous advertisements and associations between employees or businesses may be received by the input whereby the interface layer may create a cluster thus creating a variable that is then applied present advertisements and associations by the user. The output layer then uses the variable to generate a response which is useful for the automatic presentation of advertisements on a specific day, time, or for a specific employee, such that the advertisement may be duplicated at a later time without analyzing the appointments scheduled for predictive or preemptive measures for loss of engagement in scheduling.

Volume-based advertisement module 460 may also determine appropriate actions for new clients 105, such as to encourage activity from such clients 105 or reconnecting with older or former clients 105 who have not conducted business with business 110 over a period of time.

Appointment scheduling system 100 may utilize blockchain module 470 or digital certificates for the storage of an appointment transaction, the blockchain representing the completed transaction for an appointment booking, whereby administrative entity 120 or users 101, depending on the privacy settings, may view the complete history of a business 110, client 105, or employee 115. Construction and storage of blockchain allows to quickly and efficiently validate or access data using a series of connected devices that record the same event or transaction, thereby improving the safety of transactions. The storage of blockchain continues by obtaining a historical block identifier of users 101 historical blockchain. Once the various pieces of information have been collected, a validity requirement based on the transaction may be calculated whereby if the validity requirements are met, the historical blockchain may be updated. This information may be connected with third party databases such as hospital.

In one or more non-limiting embodiments, appointment scheduling system 100 may have a digital assistant module 490 operable to perform and implement various types of function, actions, and operations for appointment scheduling system 100 whereby user 101 may insert a statement or question in user interface 201 and receive a response from digital assistant module 490 that is then presented to user 101. Digital assistant module 490 may utilize a speech to text whereby digital assistant module 490 generates a set of candidate text interpretations of an auditory signal such as the vocal commands from user 101. Digital assistant module 490 may employ statistical language models to generate candidate text interpretations of auditory signals. For example, user 101 may input a vocal request, such as "remind me of my appointment with the hair salon in 3 hours" and digital assistant module 490 may receive the input vocal request and in response provide an action whereby notification module 480 may transmit a notification pertaining to the appointment after a period of 3 hours.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the above claims.

What is claimed is:

1. A computer implemented method for scheduling appointments for improving digital bookings in a geographic area, the method comprising:
   storing on a server, by an appointment scheduling system having processing system in communication with a positioning system, user data for a first user received from a first computing device of one or more computing devices having a non-transitory memory, wherein the server is configured to communicate with the one or more computing devices over a network, wherein the user data is comprising a name, a location, one or more services provided by the first user, a price of the one or more services provided by the first user, and available time periods for the one or more services to be provided, the appointment scheduling system having one or more processors; one or more memory devices coupled to the one or more processors; and one or more computerized programs, wherein the one or more computerized programs are stored in the one or more memory devices and executed by the one or more processors, the one or more computerized programs including instructions for;
   maintaining a communication link between the first computing device of a business and a second computing device of a user and the processing system such that a location tracking module is configured to verify a location of the first computing device and the second computing device;
   presenting a user interface to a second user on the second computing device, wherein the user interface comprises at least one list of available time periods for the one or more services on a virtual calendar interface having a virtual calendar;
   receiving on the server, by the appointment scheduling system via the user interface, a request from the second user on the second computing device to schedule a time period for services;
   storing on the server, by the appointment scheduling system, the received scheduling request, including the time period and the one or more services to transfer information causing an appointment to be created;
   collecting, by the appointment scheduling system, appointment data, including the time period of the appointment, a type of service of the appointment, and the price of the appointment;
   associating on the server, by the appointment scheduling system, the appointment data with the user data;
   storing, by the appointment scheduling system, the appointment data;
   providing remote access to the first user and the second user over the network to the virtual calendar with the appointment listed for visualizing and updating information about the appointment in real time;
   updating, by the appointment scheduling system, calendars of the first user and the second user on the one or more computing devices in response to the updating information by the first computing device or the second computing device;
   displaying via the second computing device on the user interface, a user selectable button presented for the second user to set up a reoccurring appointment, wherein the user selectable button provides an option to the second user to select or deselect times;
   receiving, using the one or more processors, geolocation information associated with an end user request of the first computing device and the second computing device;
   determining, by the appointment scheduling system, whether a distance between the first computing device and the second computing device are within a predetermined threshold;
   permitting, by the appointment scheduling system, access to booking the one or more services the first computing device and the second computing device that are within the predetermined threshold;

determining, by a volume-based advertisement module of the appointment scheduling system, that a ratio of appointment bookings of the business associated with the second computing device on the virtual calendar to the ratio of a second business has deviated a predetermined amount; and responsive to the determining; automatically transmitting notifications or generating an advertisement for the business on the appointment scheduling system to be displayed on the first computing device to improve overall business for the business;

identifying the time period of the appointment; and displaying a virtual map on the first computing device or the second computing device, wherein the virtual map has the location of the first computing device or the second computing device once a predesignated time before the time period of the appointment has been reached, the virtual map having one or more indicators, the one or more indicators corresponding to a location of the first user and the second user.

2. An appointment scheduling system comprising:

one or more databases coupled via a network;

one or more processors coupled to the one or more databases;

one or more computing devices coupled to the one or more processors and the one or more databases via the network, a communication link between a user computing device and a business computing device such that a location tracking module is configured to verify a location of the user computing device and the business computing device; wherein the appointment scheduling system performs steps of:

creating a business account for a business received from the business computing device, the business account comprising a name, a location, one or more services provided by the business, a price for each of the one or more services provided by the business, one or more available time periods for the one or more services;

collecting and storing data related to one or more appointment bookings of the business;

receiving, via the network, a user request from a user to schedule an appointment booking of the one or more appointment bookings from the user computing device of the one or more computing devices for the one or more available time periods on a virtual calendar interface;

displaying via the user computing device on the calendar interface a user selectable button presented to the user to set up a reoccurring appointment, wherein the user selectable button provides an option to the second user to select or deselect times;

storing, by the appointment scheduling system, appointment booking data for an appointment;

notifying, by the appointment scheduling system, the user the appointment has been created; and updating the one or more available time periods for the one or more services in the one or more databases and updating the virtual calendar interface in response to updated information by the user computing device or the business computing device.

3. The appointment scheduling system of claim 2 wherein the appointment scheduling system further performs the steps of:

receiving, using the one or more processors, geolocation information associated with a second business that is a separate from the business;

determining a first determination, using the one or more processors, whether a distance between the business and the second business is within a predetermined threshold;

determining a second determination, using the one or more processors, a ratio of an amount of appointment bookings of the business on the virtual calendar interface to appointment bookings of the second business and whether the ratio has deviated within a predetermined threshold;

responsive to the determining, automatically transmitting notifications or generating an advertisement for the business on the appointment scheduling system to be displayed on the user computing device to improve overall business for the business;

listing search request results for a plurality of businesses on the user computing device based on the business opting into volume-based advertisements on an amount of charging for the volume-based advertisements.

4. The appointment scheduling system of claim 2 wherein the appointment scheduling system further performs:

duplicating, using one or more neural networks, an advertisement for the user computing device on a specific later date or time without analyzing appointments booked for predictive or preemptive measures for loss of engagement in scheduling.

5. The appointment scheduling system of claim 2 wherein the appointment scheduling system further performs:

determining actions of a volume based advertisement module, in response that the user is a new client or old client of the business.

6. The appointment scheduling system of claim 2 wherein the appointment scheduling system further performs:

displaying a virtual map on the user computing device or the business computing device, wherein the virtual map has the location of the user computing device or the business computing device once a predesignated time before the time period of the appointment has been reached, the virtual map having one or more indicators, the one or more indicators corresponding to the location of the user and the business.

* * * * *